Dec. 7, 1965  W. D. SCHAEFFER  3,222,414
CLATHRATION PROCESS
Filed Aug. 21, 1961
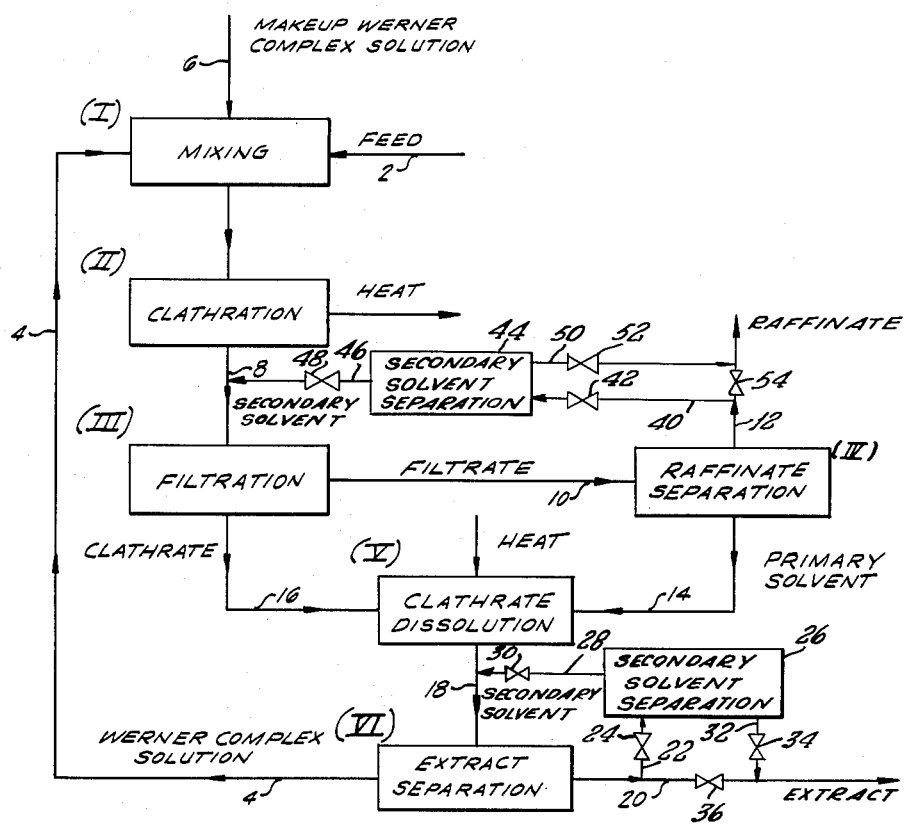
INVENTOR.
WILLIAM D. SCHAEFFER
BY
John H. Crowe
AGENT

United States Patent Office 3,222,414
Patented Dec. 7, 1965

3,222,414
CLATHRATION PROCESS
William D. Schaeffer, Pomona, Calif., assignor to Union Oil Company of California, Los Angeles, Calif., a corporation of California
Filed Aug. 21, 1961, Ser. No. 132,881
13 Claims. (Cl. 260—674)

This invention relates to a method for separating difficultly separable organic compounds such as isomers, e.g., xylenes and the like, by selective clathration with Werner complexes. Essentially, the method involves contacting the feed mixture with a liquid solution of Werner complex in a lower polyol-alkanolamine solution, then lowering the temperature to effect precipitation of the solid clathrate, and finally recovering the clathrated component by dissolving the clathrate in the lower polyol-alkanolamine solution at a relatively high temperature. It has been found that lower polyol-alkanolamine solutions display a remarkably large temperature coefficient of solubility for the Werner complexes and their clathrates, and that they do not interfere with the normal clathrating properties of the Werner complexes. Hence, they constitute highly advantageous solvent media for effecting clathration and declathration by simply shifting the temperatures over a relatively small range.

Another advantageous feature of the lower polyol-alkanolamine solvents applies particularly to the separation of hydrocarbons, or other water-insoluble mixtures. It has been found that, despite the high solvent capacity of these solvents for the Werner complex, they exhibit very little solvent capacity for hydrocarbons or other hydrophobic mixtures over the temperature ranges used for clathration and declathration. It has also been found that the clathrate crystals form preferentially in the hydrocarbon, as opposed to the solvent, phase of systems within the scope of this invention. Hence, the feed mixture is not diluted by solvent during clathration, and maximum clathration efficiency is obtained, since under these conditions the clathratable component is at its maximum activity.

The use of aqueous alkanolamine solutions as Werner complex solvents in selective clathration processes has been proposed (see my copending U.S. patent application Serial No. 3,058, filed January 18, 1960, now Patent No. 3,049,575). However, the lower polyol-alkanolamine solutions of this invention possess certain advantages over aqueous alkanolamine solutions as clathration process solvents. For one thing my lower polyol-alkanolamine mixtures are much less alkaline than aqueous alkanolamine solutions. With the latter, solvent solutions of the Werner complexes sometimes exhibit deposition of hydroxides of Werner complex metals on prolonged heating at elevated temperatures. With lower polyol-alkanolamine solutions, on the other hand, the concentration of hydroxide ion is sufficiently low as to substantially preclude or greatly diminish formation of such metal hydroxides.

The present invention is based upon my basic discovery that certain organic Werner complexes are capable of selectively absorbing or occluding, either during or after formation of their crystalline structure, certain organic compounds, while other organic compounds of similar character or physical properties are absorbed to a much smaller extent, or not at all (U.S. Patent No. 2,798,891). The specific explanation for this phenomenon is not known with certainty, but present information indicates that a "clathrate" type compound may be formed.

The "clathration" mechanism of the present invention differs from that of the classical forms of clathration, as described for example by Powell (J. Chem. Soc. (London) 1948 pp. 61–73). The classical clathrate formers are non-versatile; they will form stable clathrates only with foreign molecules of one particular dimension, coinciding with the dimensions of the crystal void spaces of the clathrate former. But the Werner complex clathrate formers described herein are found to be versatile in their clathrating properties. It is not essential that the included foreign molecules coincide in size or shape with the pre-existing crystal void spaces of the Werner complex. The same Werner complex will form clathrates with molecules varying widely in size and shape, for example, from benzene to anthracene.

Compounds which are predominantly aromatic in character exhibit a markedly greater tendency to form clathrates with the instant Werner complexes than do the less aromatic compounds. However, even when all compounds in the mixture to be separated are equally aromatic in character, one will be selectively clathrated in preference to others. The methods of the present invention are hence applicable to the separation of mixtures of the following types:

(1) Wholly aromatic, i.e., all components are predominantly or significantly aromatic in character. In this case one aromatic compound is selectively clathrated in preference to another, due primarily to steric differences in molecular form.

(2) Partially aromatic, i.e., one component is appreciably more aromatic in character than another. In this case, the more aromatic compound or compounds will in general be selectively clathrated in preference to the less aromatic compound or compounds.

Since my discovery of the basic clathration process using organic Werner complexes, various techniques have been developed for carrying out the clathration step, and for recovering the clathrated component from the clathrate. One technique involves the use of neutral organic solvent media such as methyl Cellosolve or ethylene glycol, as described in U.S. Patents Nos. 2,849,511 and 2,849,513. Despite their virtues, these processes are disadvantageous in that they require the use of fairly large volumes of expensive solvents in which the feed mixtures are relatively soluble, thereby reducing the efficiency of clathration. They also require a considerable investment in processing equipment. Another problem which has heretofore been common to nearly all clathration techniques, including the neutral organic solvent methods, involves the necessity of using heat to dissociate the clathrated component from the clathrate. The organic Werner complexes are relatively unstable and tend to lose nitrogen base upon heating, with the result that thermal recovery of the clathrated compound tends to cause some dissociation of Werner complex, resulting in contamination of the recovered compound with nitrogen base. These difficulties are not insurmountable, and various techniques have been developed for dealing with them, as in U.S. Patent No. 2,798,102, but in general the mitigation of these problems has always involved added processing costs and equipment investment which, though entirely feasible, leave considerable room for improvement.

In my co-pending application Serial No. 862,223, filed December 28, 1959, now Patent No. 3,043,892, it has been shown that aqueous solutions of strong nitrogen bases, such as ammonia, are good solvents for the Werner complexes and their clathrates. The use of aqueous ammonia is in many respects advantageous over the use of the neutral organic solvents, but aqueous ammonia does not display a temperature coefficient of solubility for the Werner complexes at all commensurate with that of the lower polyol-alkanolamine solvents of this invention. Hence, in using ammonia, it has been necessary to alternately reduce and raise the ammonia concentration in order to obtain the necessary differential solubilities to effect clathrate precipitation and clathrate dissolving. This requires the continuous evaporation and transfer of large volumes of ammonia in the process, with obvious economic consequences. The process of this invention hence avoids most of the major disadvantages of both the aqueous ammonia system and the neutral organic solvent systems.

It has now been discovered that the water-insoluble Werner complexes of nitrogen bases can be readily dissolved in lower polyol-alkanolamine solutions, and that when a saturated solution thereof is reduced in temperature by only about 40° to 70° C., the Werner complex is precipitated almost quantitatively. It has also been found that if the mixture to be separated is agitated or slurried with the Werner complex solution during precipitation from the lower polyol-alkanolamine solution, a remarkably efficient (in terms of specific resolution and clathration capacity) selective clathration takes place. It has also been discovered that the resulting solid clathrate may be easily and completely dissolved in the lower polyol-alkanolamine solution by simply raising the temperature about 40° to 70° C., thereby liberating the clathrated component and reforming the Werner complex solution for use in the clathration step. The liberated clathrated component may then be easily recovered by decantation, settling, distillation, solvent extraction or the like.

The non-clathrated portion of the feed mixture (raffinate) is separated from the clathration slurry either before or after separation of the solid clathrate therefrom. Following removal of clathrate and raffinate, the lower polyol-alkanolamine solution, usually containing some dissolved nitrogen base and Werner complex, may then be reheated and used to dissolve the clathrate, thereby "springing" the clathrated material (extract) and regenerating the Werner complex solution. Thus, a continuous recycle of lower polyol-alkanolamine and Werner complex may be maintained, with little or no loss of Werner complex, or nitrogen base. Small amounts of Werner complex and/or nitrogen base may dissolve in the raffinate or extract, but may be easily recovered therefrom by distillation, solvent extraction, azeotropic distillation, or the like, as will be more particularly described hereinafter.

It will hence be apparent that the principal object of this invention is to provide a simple and economical technique for carrying out a selective clathration, and for recovering the clathrated component. Another object is to provide a method for recovering the clathrated component without substantial heating, thereby avoiding decomposition of the Werner complex and permitting recovery thereof in a form suitable for recycle. Still another object is to provide novel means for recovering the extract and raffinate fractions of the feed in substantially pure form, substantially uncontaminated with the Werner complex or any of its constituents. A specific object is to provide an economically competitive process for resolving close-boiling mixtures of aromatic hydrocarbons, especially the xylene isomers and cymene isomers. Other objects will be apparent from the more detailed description which follows.

One of the preferred Werner complexes for use in the process of my invention for reasons made clear in U.S. Patent No. 2,798,891, adverted to above, is nickel tetra(4-methylpyridine)dithiocyanate. Hereinafter, for simplicity's sake and in accordance with customary practice among chemists, 4-methylpyridine will be abbreviated as 4MP and nickel tetra(4-methylpyridine)dithiocyanate will be identified as $Ni(4MP)_4(SCN)_2$. I shall also refer to the two portions of the Werner complex as the Werner amine (such as 4MP) and the Werner salt (such as $Ni(SCN)_2$).

Attention is now directed to the drawing which shows in schematic form one embodiment for the continuous practice of the method of this invention. In mixing step (I), feed material is introduced through line 2 to admixture with Werner complex solution which is recycled from a source hereinafter disclosed through line 4 as shown. Makeup Werner complex solution is introduced into the system as required through line 6. Clathration is effected in step (II) by agitating the mixture and reducing the temperature to cause precipitation of the solid clathrate. It is ordinarily preferred to effect the clathration at moderate temperatures from about −20° to about 150° C., and preferably between about 5° and 100° C. The solid clathrate contains the more readily clathrated portion of the feed mixture, while the less readily clathratable portion remains dissolved or dispersed in the primary solvent phase. The resulting slurry is then transferred via line 8 to filtration step (III) for purposes of separating the liquid from the crystalline solid phase. Other means for separating liquid phases from solid phases such as, for example, settling or centrifuging may be used, if desired, in place of the filtration technique. It is not always necessary or even preferred to conduct steps (I), (II) and (III) as separate operations as shown on the drawing. Any means known to those skilled in the art for effecting the overall end result of the three steps can be employed within the scope of my invention. For example, mixing step (I) and clathration step (II) can be combined if desired but this would perhaps be more readily achievable in a batch system rather than a continuous one such as that illustrated in the drawing.

The liquid filtrate is then transferred via line 10 to raffinate separation step (IV) where the non-clathrated portion of the feed is allowed to stratify and separate. It is assumed for purposes of a simplified explanation and greater ease of understanding, that the feed is a mixture of hydrocarbons immiscible with the lower polyol-alkanolamine solvent and thus that such stratification into separate liquid phases readily occurs. The raffinate phase, of non-clathrated feed material, is then withdrawn via line 12. The lower polyol-alkanolamine solvent (hereinafter referred to as the primary solvent) phase from step (IV) is then transferred via line 14 to clathrate dissolving step (V) to which the solid clathrate from filtration step (III) is also transferred, via line 16. There is normally dissolved in the raffinate phase of the filtrate from filtration step (III) a small amount of Werner amine. In order to recover this Werner amine for reuse in the system, various recovery techniques have been integrated with or incorporated into raffinate separation step (IV). In this connection it is known to employ a secondary solvent which preferentially dissolves the non-clathrated feed material and the Werner amine from the filtrate, or such a secondary solvent in conjunction with an organic acid such as succinic acid, in such fashion as to effect a recovery of said Werner amine. Methods of so using these materials will be discussed in greater detail hereinafter.

In clathrate dissolution step (V), the solid clathrate is redissolved in the primary solvent by raising the temperature a suitable amount such as, for example, from about 40° to about 70° C. Upon dissolution of the clathrate, the clathrated component of the feed normally forms a separate liquid phase. This two-phase mixture is then transferred via line 18 to extract separation step (VI), wherein the formerly clathrated portion of the feed is separated by settling and decantation or any other desired or suitable method. Here again, as in the case of raffinate separation step (IV), additional means such as those employing a secondary solvent or such a solvent along with an organic acid may be used in conjunction or as a part of step (VI) for recovery of Werner amine dissolved in the extract product. The extract mixture of clathrated feed material is removed via line 20 as one product of the clathration separation operation (the other product being the raffinate removed from the system in raffinate separation step (IV)), and the Werner complex solution from extract separation step (VI) is recycled through line 4 to mixing step (I).

The Werner complexes suitable for use in the method of this invention are made up of at least three constituents. The fundamental unit is a Werner salt, this being a salt of a metal having an atomic number above 12, as one constituent, which is capable of forming coordinate complexes of the Werner type. I have observed that divalent metals having incompletely filled 3d or 4d electron shells are particularly amenable to Werner complex formation. Examples of some metals fitting this description are manganese, iron, cobalt, nickel, palladium and platinum, of which the first four are preferred because of their good performance characteristics, relatively low cost and ready availability.

The anion of the Werner salt is a second constituent and may comprise any suitable negative radical, such for example as thiocyanate, isothiocyanate, azide, cyanate, isocyanate, cyanide, sulfate, nitrate, nitrite, chloride, bromide, iodide, phosphate, formate, acetate, and the like. A group of negative radicals found to be particularly effective for present purposes consists of the monovalent anions, particularly the thiocyanate, isothiocyanate, azide, cyanate, isocyanate and cyanide radicals. However, any anion may be utilized, the salts of which are capable of producing crystalline Werner complexes by coordinate bonding to the Werner amines hereinafter described. Such complexes are described generally in Modern Aspects of Inorganic Chemistry, Emeleus and Anderson, 79–189, Van Nostrand Co. (1946), and also in Textbook of Inorganic Chemistry, vol. X, M. M. J. Sutherland, J. P. Lippincott Co. (1928).

The third constituent of the Werner complexes consists of one or more of the Werner amines. Werner amines, as that term is employed herein, are normally heterocyclic nitrogen bases which are bound to the central metal atom of the Werner complex through coordinate bonds. The operative complexes are mainly of the tetra- and hexa-coordinate types, wherein the metal atom is coordinated with four or six atoms of basic nitrogen. The nitrogen base should be selected so as to give a maximum selective absorption for the particular compound which is to be absorbed into the crystal lattice of the complex. For example, if it is desired to absorb p-xylene, a very suitable nitrogen base is 4-methylpyridine. Not all nitrogen bases are equally effective in forming complexes which will absorb the desired component. For example, the 3-methylpyridine complex with nickel thiocyanate is not as effective as the 4-methylpyridine complex for absorbing p-xylene, presumably because of the steric effects of the 3-methyl group. However, the 3-methyl pyridine complex may be used advantageously for absorbing other compounds. The nitrogen bases should therefore be selected by a judicious combination of theoretical reasoning and actual testing of the complexes with the particular mixture to be separated. The overall molecular dimensions of the nitrogen base should preferably approximate the overall molecular size of the compound to be absorbed in the complex.

In general, any heterocyclic nitrogen base may be employed which is sufficiently basic to form coordinate complexes with the above-described salts. This includes monocyclic and polycyclic compounds, wherein at least one of the heterocycles contains from one to three hetero-N atoms. In overall size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, substituted pyrroles, piperidines, substituted piperidines, and the like.

A particularly preferred class of organic bases are the heterocyclic, resonance-stabilized bases which contain one to three, but preferably one, hetero-N atoms. Suitable examples are pyridine, the picolines, pteridine, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds are sufficiently strong bases to form relatively stable Werner complexes, and the resulting complexes are capable of selectively forming clathrates stable at room temperatures with a wide variety of aromatic compounds. Suitable substituted pyridines comprise the following:

4-methylpyridine
4-ethylpyridine
4-n-propylpyridine
4-isopropylpyridine
4-n-butylpyridine
4-n-hexylpyridine
4-vinylpyridine
4-fluoropyridine
4-chloropyridine
4-bromopyridine
4-hydroxypyridine
4-hydroxymethylpyridine
4-methoxypyridine
4-aminopyridine
methylisonicotinate
4-cyanopyridine
4-acetylpyridine
4-chloromethylpyridine
3-methylpyridine
3-ethylpyridine
3-n-propylpyridine
3-isopropylpyridine
3-n-butylpyridine
3-vinylpyridine
3-chloropyridine
3-hydroxypyridine
3-methoxypyridine
3-acetylpyridine
3-cyanopyridine
ethyl nicotinate
3,4-dimethylpyridine
3,4-diethylpyridine
3-methyl, 4-ethylpyridine
4-methyl, 3-ethylpyridine
4-methyl, 3-n-hexylpyridine
4-methyl, 3-cyanopyridine
4-chloro, 3-methylpyridine
4-acetyl, 3-methylpyridine
4-methoxy, 3-ethylpyridine
isoquinoline While, as indicated above, the Werner amines suitable for use in the preparation of Werner complexes within the scope of this invention are normally heterocyclic nitrogen bases, it is not essential that this be the case and other nitrogen bases known to form Werner complexes suitable for purposes of our invention can be used in lieu of said heterocyclic bases if desired. Particularly exemplary of nitrogen bases, other than heterocyclic bases, suitable for such purposes, are the substituted primary benzylamines having one or the other of the following general formulas:

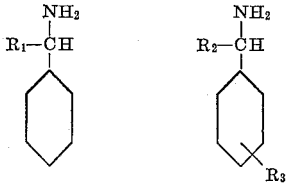

wherein $R_1$ is a primary alkyl group, $R_2$ is H or a primary alkyl group and $R_3$ is a neutral, relatively non-coordinating functional group such as alkyl, halogen, hydroxyl, nitro, alkoxy, aryloxy, cyano, carboalkoxy, alkanoyl, acetyl, etc., which is compatible with any functional groups present in the mixture of compounds to be separated by the particular Werner complex under consideration; $R_3$ may be either polar or not and it can be located on the ortho, meta or para position of the benzene ring.

Some typical compounds fitting the above description are:

α-methylbenzylamine
α-ethylbenzylamine
α-propylbenzylamine
α-butylbenzylamine
α-isobutylbenzylamine
α-amylbenzylamine
α-hexylbenzylamine
α-octylbenzylamine
α-methyl-p-methylbenzylamine
α-methyl-o-methylbenzylamine
α-methyl-p-ethylbenzylamine
α-methyl-p-isopropylbenzylamine
α-methyl-p-t-butylbenzylamine
α-methyl-p-methoxybenzylamine
α-methyl-p-fluorobenzylamine
α-methyl-p-chlorobenzylamine
α-methyl-o-chlorobenzylamine
α-methyl-p-bromobenzylamine
α-methyl-p-iodobenzylamine
α-methyl-m-nitrobenzylamine
α-propyl-p-methylbenzylamine
α-propyl-p-bromobenzylamine
α-isobutyl-p-bromobenzylamine
α-methyl-p-cyclohexylbenzylamine
p-methylbenzylamine
p-bromobenzylamine
p-dimethylaminobenzylamine Many other similar examples of suitable Werner amines could be cited, as will be apparent to those skilled in the art, and the complexes may include only one such amine, or a mixture of two or more may be employed, in which case a mixed complex is formed.

The preferred Werner complexes of monovalent anion salts of this invention may be designated by the following general formula:

(I) $\qquad [X(Z)_y(A)_n]$ wherein X is the metal atom as above defined, Z is the Werner amine, A is the anion as above defined, $y$ is a number from 2 to 6, and $n$ is a number from 1 to 3.

Examples of suitable complexes which may be employed are as follows:

[Ni(4MP)$_4$(SCN)$_2$]
[Cu(4MP)$_4$(SCN)$_2$]
[Hg(4MP)$_4$(NNN)$_2$]
[Ni(1-hexylamine)$_6$(SCN)$_2$]
[Co(pyridine)$_4$(OCN)$_2$]
[Cd(4MP)$_4$(CN)$_2$]
[Ag(4MP)$_2$(NNN)]
[Cr(pyridine)$_4$SO$_4$]
[Ti(isoquinoline)$_3$(NH$_3$)$_3$(C$_2$O$_4$)$_2$]
[Ni(4MP)$_4$Cl$_2$]
[Ni(4MP)$_4$(N$_3$)$_2$]
[Ni(4-n-propylpyridine)$_4$(SCN)$_2$]
[Ni(isoquinoline)$_4$Cl$_2$]
[Ni(4MP)$_4$Br$_2$]
[Mn(4MP)$_4$(SCN)$_2$]
[Mn(isoquinoline)$_4$(SCN)$_2$]
[Zn(4MP)$_4$Cl$_2$]

Obviously many other complexes similar to the above could be employed, not all of which would give optimum separation of all mixtures but which should be selected to meet the specific peculiarities of the mixture concerned.

The Werner complexes suitable for use in this invention may be prepared in dry form by any conventional method such as, for example, precipitation from an aqueous solution. This precipitation can be accomplished by first forming in solution the desired metal salt containing the X and A constituents of Formula I, above. To this solution is then added from about 2 to about 6 mols per mol of the metal salt, of the desired nitrogen base Z. The Werner complex thereupon precipitates and is removed and dried. The drying may be accomplished in a stream of air at room temperature, or at a slightly elevated temperature. For a more detailed disclosure of the preparation of Werner complexes of the instant type, see my U.S. Patent 2,798,891, previously referred to herein.

The amount of complex to be employed, relative to the feed mixture, depends upon its specific capacity for absorbing the particular feed component concerned, and also upon the proportion of that component present in the original mixture, as well as upon the temperature of clathration. The complexes are found in general to be capable of absorbing between about 5 percent and about 70 percent by weight of absorbable compounds. Optimum efficiency may require that more or less than this "stoichiometric" amount of complex be employed, depending upon its relative capacity for other components in the mixture to be resolved. In general, the amount of complex to be employed may vary between about 0.25 and about 20 parts by weight per part of the feed component to be clathrated. Smaller proportions of complexes will generally yield a purer extract, while larger proportions result in more complete recovery of absorbable components from the feed mixture.

The preferred concentrations of Werner complexes in Werner complex solutions will vary, depending upon the particular complex and primary solvent ingredients involved. Where the preferred Werner complex, $$Ni(4MP)_4(SCN)_2$$

is employed in a primary solvent containing ethylene glycol and ethanolamine as ingredients, best results are generally achieved with Werner complex concentrations of from about 15 to about 40 percent by weight. Incidentally, all concentrations set forth herein, unless otherwise specified, are on a weight basis. For optimum results, the concentration of Werner complex in primary solvent should be adjusted so as to assure a substantially saturated solution at the dissolution temperature of the process. The saturation concentrations of Werner complexes vary, depending upon temperature, the particular ingredients involved, etc., but the determination of such concentrations is a simple matter to those skilled in the art. This is likewise true with respect to the determination of preferred operating temperatures and temperature-Werner complex concentration combinations.

The primary solvents employed herein contain a lower polyol plus an alkanolamine, preferably a lower alkanolamine. The ratio of alkanolamine to lower polyol will vary widely depending upon the Werner complex used and the particular alkanolamine. Generally, the primary solvent will contain between about 10% and about 90% by weight alkanolamine. The ratio should be such as to provide the desired differential solubility of Werner complex therein, at the respective clathration and declathration temperatures. Ethanolamine, or as it is sometimes called mono-ethanolamine (frequently abbreviated MEA) is our preferred alkanolamine because of its ready availability, relatively low cost and excellent performance. Preferred concentrations of ethanolamine range between about 10% and 70% by weight in both the clathration and declathration steps of our process. In all cases, it is preferred to use sufficient lower polyol to render the feed mixture substantially insoluble in the primary solvent.

Other alkanolamines which may be used in place of ethanolamine include, diethanolamine; triethanolamine; 2-amino-n-butanol; 2-amino-2-methyl-1-propanol; 2-(methylamino)ethanol; 2-(ethylamino)ethanol; 2-amino-2-ethyl-1,3-propanediol; 2-amino-2-methyl-1,3-propanediol; and the like. In general any lower alkanolamine containing from 2 to about 10 carbon atoms, from 1 to 3 amino groups, and from 1 to 3 hydroxyl groups may be employed, including primary, secondary, and tertiary amines. The operative ratios of alkanolamine in the primary solvent may vary widely, e.g., from about 2% to 75% by weight. Preferred ratios generally fall within the range from about 10% to about 70%. The greater the concentration of alkanolamine in the solvent, the greater will be the solubility of Werner complex and feed mixture therein.

In general, any water-soluble alkanolamine having a dissociation constant greater than about $10^{-6}$, and greater than the dissociation constant of the Werner amine, may be used in the primary solvents of this invention.

The lower polyol components of my primary solvents are preferably those lower polyhydric alcohols containing two or three hydroxyl groups which are liquid at standard conditions of temperature and pressure. Examples of suitable lower polyols for use in this invention are:

ethylene glycol
pentamethylene glycol
hexamethylene glycol
2,3-butanediol
1,4-butanediol
1,3-butanediol
1,2-butanediol
trimethylene glycol
propylene glycol
glycerol
quintenyl glycerine
diethylglycerol The preferred lower polyol for purposes of this invention is ethylene glycol because of its ready availability and excellent performance. It is, of course, within the scope of my invention to employ mixtures of suitable polyols, as well as alkanolamines, in my primary solvent mixtures.

A wide variety of feed mixtures may be resolved by the methods described herein. These methods are operative for separating substantially any mixture of organic compounds wherein the components differ in molecular configuration, and wherein at least one component is substantially aromatic in character. By "substantially aromatic" is meant that at least about 20% of the carbon atoms in the molecules to be clathrated are present as digits of an aromatic ring. Any remaining carbon atoms may be present as saturated or unsaturated aliphatic side chains, or saturated or unsaturated non-aromatic ring systems. Such compounds may contain a total of from 4 to 60 carbon atoms, preferably from 6 to 20.

A difference in "molecular configuration," as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character of the Werner complex. Generally excluded are those compounds which are either so acidic as to decompose the Werner complex, or so basic as to displace the heterocyclic base from the Werner complex. In general, the pH of an aqueous mixture of the compounds to be separated should fall between about 4 and the pH of an aqueous solution of the heterocyclic base employed in the Werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the fed components are as follows: —F, —Cl, —Br, —I, $NO_2$, aryl-$NH_2$, —OR, alkyl-OH, aralkyl-OH, =CO, —CHO, —CN, —COOR, —COR, —COO-metal, —SR, —$CONH_2$, wherein R is a hydrocarbon radical. Many groups of a similar nature may be present. Functional groups which are generally, though not always, disruptive and to be avoided are —SH, aryl-OH, —COOH, and the like, unless they are first converted to more nearly neutral derivatives.

Examples of mixtures which may be separated herein include the following, but these examples are by no means exhaustive:

A. Hydrocarbon mixtures:

o-ethyl toluene
p-ethyl toluene
o-ethyl toluene
m-ethyl toluene
p-ethyl toluene
m-ethyl toluene
mesitylene
pseudocumene
cumene
mesitylene
cumene
pseudocumene
p-cymene
p-diethylbenzene
m-cymene
mesitylene
prehnitene
durene
durene
isodurene
prehnitene
isodurene
cyclohexane
benzene
methyl-cyclohexane
toluene
benzene
n-heptane
benzene
2,3-dimethyl pentane
methyl cyclopentane
benzene
picene
chrysene
picene
1,2,5,6-dibenzanthracene
tetralin
naphthalene
tetralin
decalin
diphenyl
diphenyl methane
anthracene
phenanthrene
1-methyl anthracene
1-methyl phenanthrene
naphthalene
diphenyl
1-methyl anthracene A. Hydrocarbon mixtures—Continued
- 2-methyl anthracene
- 1-methyl naphthalene
- 2-methyl naphthalene
- 1-ethyl naphthalene
- 2-ethyl naphthalene
- p-di-n-propyl benzene
- hexamethyl benzene
- o-cymene
- p-cymene
- o-cymene
- m-cymene
- m-cymene
- p-cymene
- p-methyl styrene
- m-methyl styrene
- p-methyl styrene
- o-methyl styrene B. Hydrocarbon-non-hydrocarbon mixtures:
- 2,5-dimethylfuran
- benzene
- anthraquinone
- anthracene
- benzene
- thiophene
- 2-methyl thiophene
- toluene
- o-xylene
- thiophene C. Non-hydrocarbon mixtures:
- o-methyl toluate
- p-methyl toluate
- o-methyl toluate
- m-methyl toluate
- p-methyl toluate
- m-methyl toluate
- 1-nitro naphthalene
- 2-nitro naphthalene
- 1-amino naphthalene
- 2-amino naphthalene
- aniline
- nitrobenzene
- o-toluidine
- p-toluidine
- o-nitrotoluene
- p-nitrotoluene
- o-dichlorobenzene
- p-dichlorobenzene
- o-chlorotoluene
- p-chlorotoluene
- o-methyl anisole
- p-methyl anisole
- coumarin
- vanillin
- furan
- thiophene
- sodium p-cresylate
- sodium m-cresylate
- potassium terephthalate
- potassium isophthalate
- dimethyl isophthalate
- dimethyl terephthalate
- dimethyl isophthalate
- dimethyl orthophthalate
- sodium o-toluene sulfonate
- sodium p-toluene sulfonate
- sodium-1-methyl-3-naphthalene sulfonate
- sodium-1-methyl-4-naphthalene sulfonate
- estriol
- estrone
- estriol
- estradiol
- picolinic acid
- nicotinic acid
- thymol
- menthol
- 2-naphthol-6-sodium sulfonate
- 2-naphthol-8-sodium sulfonate
- p-amino benzaldehyde
- o-amino benzaldehyde
- benzidine
- p-semidine
- 2,4-dinitro-chloro-benzene
- 2,5-dinitro-chloro-benzene
- isosafrol
- piperonal
- o-vanillin
- isovanillin
- o-vanillin
- vanillin
- o-phenylene diamine
- p-phenylene diamine
- p-phenetidine
- phenacetin
- isoeugenol
- vanillin
- p-methyl thiophenol
- m-methyl thiophenol
- diazoaminobenzene
- p-aminoazobenzene
- N,N-dimethyl aniline
- aniline
- methyl benzoate
- ethyl benzoate
- terephthalonitrile
- isophthalonitrile
- p-tolunitrile
- m-tolunitrile
- methyl salicylate
- methyl p-hydroxy benzoate
- p-methyl acetanilide
- m-methyl acetanilide
- p-aminobenzenesulfonamide
- m-aminobenzenesulfonamide
- sodium anthranilate
- sodium phthalamate
- alpha-picoline
- beta-picoline
- 2,4-lutidine
- 2,6-lutidine It will be noted that some of the foregoing compounds are fairly soluble in water, and in the clathration solvent. In general this does not critically affect the clathration or declathration steps, but may necessitate using different techniques for recovering the raffinate and extract products from the clathration solvent. Conventional techniques such as solvent extraction, distillation, fractional crystallization, chemical scavenging, precipitation or the like may be utilized for this purpose, the choice of the particular method depending upon the particular compounds involved, as will be understood by those skilled in the art.

As pointed out above in the description of the drawing, there are various techniques which can be used in connection with raffinate separation step (IV) and extract separation step (VI) to recover dissolved Werner amines from product streams such as the raffinate and extract phases of those steps. A problem of Werner amine loss in such raffinate and extract phases is particularly acute in systems employing 4MP as the Werner amine and in which the raffinate and extract products are xylene isomers.

In one technique for reducing or substantially eliminating the loss of Werner amine in the raffinate product, a secondary solvent is added to the Werner coplex solution-feed mixture, either before or after precipitation of the clathrate, to form a solution with the non-clathratable feed material and the minor amount of Werner amine dissolved therein. In an example of a process modification incorporating the use of a secondary solvent, normally closed valves 42, 48, and 52 are opened and normally open valve 54 is closed. The secondary solvent is introduced via line 46 to the mixture in line 8. This mixture then passes to filtration step (III) as hereinabove described. The filtrate from step (III), comprising non-clathrated feed material, Werner amine, primary solvent, and secondary solvent, passes to raffinate separation step (IV) via line 10. Where the feed mixture is composed of aromatic hydrocarbons, such as xylene isomers, the secondary solvent can be a paraffinic or naphthenic hydrocarbon such as pentane, heptane, octane, nonane, or a mixture of hydrocarbons such as an alkylate fraction.

The solution of non-clathrated feed material, Werner amine and secondary solvent is separated in raffinate separation step (IV) from the primary solvent phase of the filtrate from step (III) and sent to a secondary solvent separation step 44 via line 12, line 40, and open valve 42. Secondary solvent separation step 44 may be, for example, a fractional distillation operation, wherein secondary solvent and Werner amine are distilled overhead and returned to the process via line 46 and open valve 48, and the non-clathrated feed material (or raffinate) is recovered as a bottoms product which is withdrawn from the process via line 50 and open valve 52. Thus, the secondary solvent-Werner amine overhead product can be recirculated to line 8, as illustrated, or to steps (I) or (II) for reuse (as a secondary solvent) in the system.

Similarly, Werner amine can be substantially recovered from the step (VI) extract phase by the use of a secondary solvent. In this modification of the process, normally closed valves 24, 30, and 34 are opened and normally open valve 36 is closed. Thus a secondary solvent of the above-identified type can be added via line 28 to the liquid from clathrate dissolution step (V) flowing in line 18, after which a solution of the formerly clathrated feed material (or extract), containing a minor amount of Werner amine, and the secondary solvent forms in extract separation step (VI) as a distinct liquid phase which can be isolated and sent to a secondary solvent separation step 26 via line 20, line 22, and open valve 24. Here again, as with the raffinate, secondary solvent separation step 26 can be fractional distillation yielding a secondary solvent-Werner amine overhead which may, as illustrated, be recycled to the system via line 28 and valve 30, and yielding a bottoms product consisting essentially of the formerly clathrated or extract portion of the feed which is withdrawn as a product of the process from secondary solvent separation step 26 via line 32 and valve 34.

A more complete recovery of the Werner amine from the raffinate and extract process streams can be accomplished by the use of an aqueous carboxylic acid, such as succinic acid, solution in conjunction with a secondary solvent of the above noted type. When this technique is employed, the procedure with respect to the raffinate treatment is similar to that with respect to the extract treatment. Thus, in either event, the first step is to form a three-component solution, in the manner previously set forth, of an appropriate secondary solvent; non-clathrated or formerly clathrated feed material, depending upon whether the raffinate or extract is involved; and Werner amine. The three-component solution will hereinafter, for simplicity's sake, be discussed in terms of a typical formulation in which the secondary solvent is paraffinic hydrocarbon, the feed material is xylene and the Werner amine is 4MP.

Typically, the three-component solution is contacted with an aqueous carboxylic acid solution to produce a 2-phase mixture, one phase consisting essentially of xylene and paraffinic hydrocarbon and the other phase consisting essentially of the aqueous carboxylic acid solution and 4MP. The aqueous phase is distilled to produce an overhead azeotrope of 4MP and water and a bottoms of aqueous carboxylic acid substantially free of 4MP which can be recirculated through the system. The xylene-paraffinic hydrocarbon phase is distilled to remove substantially all of the xylene, as an overhead, leaving substantially pure paraffinic hydrocarbon as the bottoms product.

The aforesaid 4MP-water azeotrope can be contacted with said paraffinic hydrocarbon bottoms product, or other hydrocarbon liquid in which 4MP is soluble such as xylene feedstock, to produce a two-phase liquid mixture, one phase comprising substantially pure water which can be recycled in the system to prevent loss of water from the recirculating aqueous carboxylic acid solution, and the other phase comprising hydrocarbn liquid and 4MP which has been extracted from said azeotrope. The latter phase can be appropriately recirculated to the clathration process to return the recovered 4MP to the system.

A more detailed description of the subject Werner amine recovery method, in which carboxylic acid is employed, can be found in my copending U.S. Patent application Serial No. 65,641, filed October 28, 1960.

To contribute to a better understanding of this invention, the following examples are presented. It is emphasized, however, that these examples are presented merely for illustrative purposes and that the invention is not limited to the particular embodiments and conditions set forth therein.

*Example I*

This example illustrates the effectiveness with which xylene mixtures can be separated by means of my new clathration process.

To a 300 ml. 2-necked flask equipped with a stirrer, condenser and thermometer was added 40 g. of $Ni(4\text{-methylpyridine})_4\text{-}(SCN)_2$, 17 ml. of ethanolamine and 108 ml. of ethylene glycol. The mixture was heated to solution (95° C.), then 23 ml. of feed xylene was added. The mixture was cooled to 25° C. stirred for 10 minutes, then 50 ml. of isooctane was added. After two minutes of stirring, the mixture was filtered. The solid on the filter was decomposed in dilute hydrochloric acid and the released hydrocarbon was separated and analyzed.

The two phase filtrate was separated. The hydrocarbon portion was analyzed. The analyses are given below:

|  | Analyses, Vol. Percent | | | | Recovery [a] | |
|---|---|---|---|---|---|---|
|  | p-Xylene | m-Xylene | o-Xylene | Et. Bz. | p-Xylene | m-Xylene |
| Feed | 14.8 | 81.2 | 0.6 | 3.3 |  |  |
| Xylene from crystals | 52.6 | 41.9 | 0.3 | 5.2 | 90.3 | 17.0 |
| Xylene from filtrate | 1.2 | 95.8 | 0.5 | 2.5 | 9.7 | 83.0 |

[a] Volume percent of the isomer in the feed.

Handling losses were distributed equally between the two streams produced.

As those skilled in the art will appreciate, the above results are indicative of very good separation of the p- and m-xylenes in the feed mixture.

*Example II*

This is an example of the practice of my invention similar to, but in more complete detail, than Example I.

Nickelous sulfate and ammonium thiocyanate were dissolved in water and 4-methylpyride was added thereto to precipitate the Werner complex: Ni(4MP)$_4$(SCN)$_2$. The solid material was separated from the resulting slurry as a hydrous solid of approximately 30% by weight water and air-dried for several hours at ambient temperature in finely divided condition.

To a 300 ml. 3-necked flask equipped with a stirrer, condenser, and thermometer is added 40 g. of

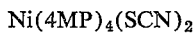
Ni(4MP)$_4$(SCN)$_2$ prepared as described above, 17 ml. of ethanolamine and 108 ml. of ethylene glycol. The mixture is heated to solution (95° C.), then 23 ml. of feed xylene containing 14.8 percent p-xylene, 81.2 percent m-xylene, 0.6 percent o-xylene and 3.3 percent ethylbenzene, all percentages being given on a volume basis, are added. The mixture is cooled to 25° C., stirred for 10 minutes, then 50 ml. of isooctane are added. After two minutes of stirring, the mixture is filtered. The filtrate consists of two phases, a hydrocarbon phase of unclathrated feed material and isooctane and a primary solvent phase.

The filtrate is separated into its two phases and the hydrocarbon phase is analyzed as in Example I. The primary solvent phase is heated to a temperature of 97° C. at which temperature the Werner complex is soluble therein. The filtered solid material is mixed into the heated primary solvent wherein it dissolves to create two liquid phases, an upper hydrocarbon extract phase and a lower Werner complex solution phase. The hydrocarbon phase is separated and analyzed.

The analytical results of the products of this example are substantially equivalent to the corresponding results of Example I.

Following are additional examples of the utilization of the process of my invention with various Werner complex solutions and feed mixtures.

Example III

A quantity of Co(pyridine)$_4$(OCN)$_2$ in dry form is prepared in accordance with the teachings of U.S. Patent 2,798,891. A portion of the Co(pyridine)$_4$(OCN)$_2$ is dissolved in a primary solvent, at a temperature of 100° C., consisting of a mixture of 2-amino-2-methyl-1-propanol and glycerol. The quantities of the ingredients are adjusted to yield a 35 percent solution of Co(pyridine)$_4$(OCN)$_2$ in a primary solvent containing 40 percent 2-amino-2-methyl-1-propanol and 60 percent glycerol.

A mixture of m-cymene and mesitylene is added, with stirring, to the above-described Werner complex solution at a Werner complex/mesitylene weight ratio of 10. The mixture is cooled to a temperature of about 25° C., at which point the solid clathrate is filtered from the mixture. The filtrate comprises two liquid phases, a raffinate phase and a primary solvent phase. The raffinate phase is separated from the filtrate as a product enriched in m-cymene.

The solid clathrate is added to the primary solvent phase of the filtrate. The resulting mixture is heated to a temperature of 100° C. to dissolve the clathrate. The dissolution of the clathrate results in the formation of two liquid phases, one comprising an extract hydrocarbon phase and the other comprising reconstituted Werner complex solution. The extract phase is enriched in mesitylene.

Example IV

A quantity of Mn(isoquinoline)$_4$(SCN)$_2$ in dry form is prepared in accordance with the teachings of U.S. Patent 2,798,891. A portion of the Mn(isoquinoline)$_4$(SCN)$_2$ is dissolved in a primary solvent, at a temperature of 90° C., consisting of a mixture of 2-amino-n-butanol and 1,4-butanediol. The quantities of ingredients are adjusted to yield a 20 percent solution of Mn(isoquinoline)$_4$(SCN)$_2$ in a primary solvent containing 38.8 percent 2-amino-n-butanol and 61.2 percent 1,4-butanediol.

A mixture of m-ethyltoluene and p-ethyltoluene is added, with stirring, to the above-described Werner complex solution at a Werner complex/p-ethyltoluene weight ratio of 9.5. The mixture is cooled to a temperature of about 20° C., at which point the solid clathrate is filtered from the mixture. The filtrate comprises two liquid phases, a raffinate phase and a primary solvent phase. The raffinate phase is separated from the filtrate as a product enriched in m-ethyltoluene.

The solid clathrate is added to the primary solvent phase of the filtrate. The resulting mixture is heated to a temperature of 90° C. to dissolve the clathrate. The dissolution of the clathrate results in the formation of two liquid phases, one comprising an extract hydrocarbon phase and the other comprising reconstituted Werner complex solution. The extract phase is enriched in p-ethyltoluene.

Example V

A quantity of Fe(4-ethylpyridine)$_4$(CH$_3$CO$_2$)$_2$ in dry form is prepared in accordance with the teachings of U.S. Patent 2,798,891. A portion of the Fe(4-ethylpyridine)$_4$(CH$_3$CO$_2$)$_2$ is dissolved in a primary solvent, at a temperature of 85° C., consisting of a mixture of 2-(methylamino)ethanol and pentamethylene glycol. The quantities of ingredients are adjusted to yield a 20 percent solution of Fe(4-ethylpyridine)$_4$(CH$_3$CO$_2$)$_2$ in a primary solvent containing 20 percent 2-(methylamino)-ethanol and 80 percent pentamethylene glycol.

A mixture of biphenyl and diphenyl methane is added, with stirring, to the above described Werner complex solution at a Werner complex/biphenyl weight ratio of 10. The mixture is cooled to a temperature of about 0° C., at which point the solid clathrate is filtered from the mixture. The filtrate comprises two liquid phases, a raffinate phase and a primary solvent phase. The raffinate phase is separated from the filtrate as a product enriched in diphenyl methane.

The solid clathrate is added to the primary solvent phase of the filtrate. The resulting mixture is heated to a temperature of 85° C. to dissolve the clathrate. The dissolution of the clathrate results in the formation of two liquid phases, one comprising an extract hydrocarbon phase and the other comprising reconstituted Werner complex solution. The extract phase is enriched in biphenyl.

Example VI

A quantity of Pt(4-methoxy,3-ethylpyridine)$_4$(SCN)$_2$ in dry form is prepared in accordance with the teachings of U.S. Patent 2,798,891. A portion of the Pt(4-methoxy,3-ethylpyridine)$_4$(SCN)$_2$ is dissolved in a primary solvent, at a temperature of 85° C., consisting of a mixture of triethanolamine and trimethylene glycol. The quantities of ingredients are adjusted to yield a 30 percent solution of Pt(4-methoxy,3-ethylpyridine)$_4$(SCN)$_2$ in a primary solvent containing 30 percent triethanolamine and 70 percent trimethylene glycol.

A mixture of tetralin and naphthalene is added, with stirring, to the above-described Werner complex solution at a Werner complex/naphthalene weight ratio of 10. The mixture is cooled to a temperature of about 20° C., at which point the solid clathrate is filtered from the mixture. The filtrate comprises two liquid phases, a raffinate phase and a primary solvent phase. The raffinate phase is separated from the filtrate as a product enriched in tetralin.

The solid clathrate is added to the primary solvent phase of the filtrate. The resulting mixture is heated to a temperature of 85° C. to dissolve the clathrate. The dissolution of the clathrate results in the formation of two liquid phases, one comprising an extract hydrocarbon phase and the other comprising reconstituted Werner complex solution. The extract phase is enriched in naphthalene.

Example VII

A quantity of Ni(4-chloro,3-methylpyridine)$_4$Cl$_2$ in dry form is prepared in accordance with the teachings of U.S. Patent 2,798,891. A portion of the Ni(4-chloro,3-methylpyridine)$_4$Cl$_2$ is dissolved in a primary solvent, at a temperature of 90° C., consisting of a mixture of diethanolamine and 2,3-butanediol. The quantities of ingredients are adjusted to yield a 25 percent solution of Ni(4-chloro,3-methylpyridine)$_4$Cl$_2$ in a primary solvent containing 30 percent diethanolamine and 70 percent 2,3-butanediol.

A mixture of durene and isodurene is added, with stirring, to the above-described Werner complex solution at a Werner complex/durene weight ratio of 10. The mixture is cooled to a temperature of about 20° C., at which point the solid clathrate is filtered from the mixture. The filtrate comprises two liquid phases, a raffinate phase and a primary solvent phase. The raffinate phase is separated from the filtrate as a product enriched in isodurene.

The solid clathrate is added to the primary solvent phase of the filtrate. The resulting mixture is heated to a temperature of 85° C. to dissolve the clathrate. The dissolution of the clathrate results in the formation of two liquid phases, one comprising an extract hydrocarbon phase and the other comprising reconstituted Werner complex solution. The extract phase is enriched in durene.

It will be apparent to those skilled in the art that my process can be carried out with a great number and variety of Werner complex solutions for purposes of separating many types of difficulty separable compounds from their mixtures by merely performing the process as taught herein, using different combinations of the various Werner complex and primary solvent ingredients and feed materials within the scope of the invention.

I claim:

1. A method for resolving a feed mixture of organic compounds differing in molecular configuration comprising: (1) forming a solution of a Werner complex in a substantially anhydrous primary solvent comprising a lower polyol and alkanolamine solution; (2) effecting intimate contact of said solution with said feed mixture; and (3) cooling the resulting mixture to effect precipitation of a solid clathrate of at least one component of said feed mixture with said Werner complex.

2. A method of resolving a feed mixture of organic compounds differing in molecular configuration and wherein at least one component is substantially aromatic, comprising: (1) forming a solution of a Werner complex comprising a salt of a metal of atomic number above 12 coordinated with a Werner amine in a substantially anhydrous primary solvent comprising a lower polyol and alkanolamine solution; (2) mixing the resulting solution with said mixture; (3) reducing the temperature of the resulting mixture to effect precipitation of solid clathrate of at least one substantially aromatic component of said feed mixture with said Werner complex; (4) separating said solid clathrate from the resulting mixture to leave two liquid phases, one comprising primary solvent and the other comprising non-clathrated feed mixture material; (5) separating said two liquid phases; (6) raising the temperature of the primary solvent phase to a point at which said Werner complex is substantially soluble therein; and (7) dissolving said solid clathrate in the heated primary solvent from step (6) to free the clathrated material therefrom, which forms as one phase, and regenerated Werner complex solution which forms as a second phase.

3. A method for resolving a mixture of disubstituted benzene isomers including a para-isomer comprising: (1) forming a solution of a Werner complex consisting of a salt selected from the group consisting of the thiocyanates, isothiocyanates, cyanates, isocyanates, cyanide, and azides of metals selected from the group consisting of manganese, iron, cobalt and nickel, coordinated with a heterocyclic nitrogen base in a substantially anhydrous primary solvent comprising a lower polyol and alkanolamine solution; (2) mixing the resulting Werner complex solution with a mixture of the disubstituted benzene isomers; (3) reducing the temperature of the resulting mixture to effect precipitation of a solid clathrate of said para-isomer with said Werner complex; (4) separating said solid clathrate from the resulting mixture to leave two liquid phases, one comprising primary solvent and the other comprising raffinate material from said mixture of disubstituted benzene isomers; (5) substantially separating said liquid phases; (6) heating the primary solvent phase to a point at which the Werner complex is substantially soluble therein; (7) dissolving the solid clathrate from step (4) in the heated primary solvent from step (6) to free said para-isomer therefrom, which forms as an extract phase, and regenerated Werner complex solution, which forms as a separate phase; and (8) separating said extract phase from the regenerated Werner complex solution phase.

4. The method of claim 3 in which the Werner complex is nickel tetra(4-methylpyridine)dithiocyanate.

5. The method of claim 3 in which the primary solvent is a mixture of ethylene glycol and monoethanolamine.

6. A method for resolving a feed mixture of disubstituted benzene isomers including a para-isomer, comprising: (1) forming a solution of a Werner complex consisting of a salt selected from the group consisting of the thiocyanates, isothiocyanates, cyanates, isocyanates, cyanides and azides of metals selected from the group consisting of manganese, iron, cobalt and nickel, coordinated with a heterocyclic nitrogen base, in a substantially anhydrous primary solvent comprising a lower polyol and alkanolamine solution; (2) mixing the resulting Werner complex solution with said mixture of disubstituted benzene isomers; (3) reducing the temperature of the resulting mixture to effect precipitation of a solid clathrate of said para-isomer with said Werner complex; (4) adding to the resulting mixture a secondary solvent to form a solution with non-clathrated feed mixture material; (5) separating said solid clathrate from the resulting mixture to leave two liquid phases, one comprising a solution of said non-clathrated feed mixture material, a minor amount of said heterocyclic nitrogen base and said secondary solvent and the other comprising said primary solvent; (6) separating said two liquid phases; (7) treating the liquid phase containing said secondary solvent to recover therefrom a fraction comprising said secondary solvent and said heterocyclic nitrogen base, and a raffinate fraction; (8) heating the primary solvent phase to a temperature at which the Werner complex is soluble therein; (9) redissolving said solid clathrate in the heated primary solvent from step (8); (10) adding to the resulting mixture a secondary solvent to form a solution with formerly clathrated feed mixture material released in step (9); (11) separating the resulting mixture into a Werner complex solution phase and an extract hydrocarbon phase; and (12) treating said extract hydrocarbon phase to recover therefrom a fraction comprising said secondary solvent and a minor amount of said heterocyclic nitrogen base and an extract hydrocarbon fraction enriched in said para-isomer.

7. The method of claim 6 in which the secondary solvent added in step (4) is a saturated hydrocarbon and the secondary solvent added in step (10) is a saturated hydrocarbon.

8. The method of claim 6 in which the fraction comprising said secondary solvent and said heterocyclic nitrogen base recovered in step (7) is recycled to step (4) and the fraction comprising said secondary solvent and said heterocyclic nitrogen base recovered in step (12) is recycled to step (10).

9. A method for resolving a xylene feed mixture including p-xylene, which comprises: (1) forming a Werner complex solution of from about 15 to about 40 percent by weight nickel tetra(4-methylpyrididine)dithiocyanate in a substantially anhydrous primary solvent comprising from about 90 to about 30 percent by weight ethylene glycol and from about 10 to about 70 percent by weight ethanolamine; (2) intimately contacting said Werner complex solution with said xylene mixture; (3) reducing the temperature of the resulting mixture to from about 5° to about 100° C. to effect precipitation of a solid clathrate of p-xylene and nickel tetra(4-methylpyridine)dithiocyanate; (4) adding to the resulting mixture a saturated hydrocarbon to form a solution with non-clathrated xylene material from said feed mixture; (5) separating said solid clathrate from the resulting mixture to leave two liquid phases, a hydrocarbon phase comprising a solution of said non-clathrated xylene material, a minor amount of 4-methylpyridine and said saturated hydrocarbon, and a primary solvent phase; (6) separating said liquid phases; (7) treating the hydrocarbon phase to recover therefrom a solution of said saturated hydrocarbon and 4-methylpyridine and a non-clathrated xylene fraction; (8) increasing the temperature of the primary solvent phase from about 40° to about 70° C. whereat the solid clathrate from step (5) is soluble therein; (9) dissolving said solid clathrate in the heated primary solvent from step (8) to liberate p-xylene therefrom; (10) adding to the mixture a saturated hydrocarbon to dissolve said p-xylene and a minor amount of 4-methylpyridine in solution therein; (11) separating the resulting mixture into a reconstituted Werner complex solution phase and an extract hydrocarbon phase; and (12) treating said extract hydrocarbon phase to recover therefrom an extract hydrocarbon fraction enriched in p-xylene.

10. The method of claim 9 in which the saturated hydrocarbon and 4-methylpyridine recovered in step (7) and the saturated hydrocarbon and 4-methylpyridine recovered in step (12) are recycled to appropriate steps of the described process.

11. The method of claim 9 in which step (7) is accomplished by (a) contacting said liquid phase containing said saturated hydrocarbon with an aqueous carboxylic acid solution to form a two-phase mixture; (b) separating said two-phase mixture into a substantially acid free phase of xylene raffinate material and saturated hydrocarbon and an aqueous phase containing said carboxylic acid and 4-methylpyridine; (c) distilling said aqueous phase to produce an overhead azeotrope of 4-methylpyridine and water and a bottoms of aqueous carboxylic acid substantially free of 4-methylpyridine; (d) distilling said substantially acid free phase of xylene raffinate material and saturated hydrocarbon to obtain an overhead xylene raffinate product and a bottoms product of said saturated hydrocarbon; (e) contacting the overhead azeotrope from step (c) with a hydrocarbon material to produce a two-phase mixture; and (f) separating said mixture into an aqueous phase and a hydrocarbon phase containing 4-methylpyridine; and step (12) is accomplished by (g) contacting said extract hydrocarbon phase with an aqueous carboxylic acid solution to produce a two-phase mixture; (h) separating said two-phase mixture into a substantially acid free phase of p-xylene enriched extract and saturated hydrocarbon and an aqueous phase containing said carboxylic acid and 4-methylpyridine; (i) distilling said aqueous phase to produce an overhead azeotrope of 4-methylpyridine and water and a bottoms of aqueous carboxylic acid substantially free of 4-methylpyridine; (j) distilling said substantially acid free phase of p-xylene enriched extract and saturated hydrocarbon to obtain an overhead p-xylene enriched extract product and a bottoms product of said saturated hydrocarbon; (k) contacting the overhead azeotrope from step (i) with a hydrocarbon material to produce a two-phase mixture; and (1) separating said mixture into an aqueous phase and a hydrocarbon phase containing 4-methylpyridine.

12. The method of claim 11 in which the xylene feed mixture comprises p-xylene and m-xylene isomers.

13. The method of claim 11 in which the saturated hydrocarbon added in step (4) and that added in step (10), is isooctane.

References Cited by the Examiner
UNITED STATES PATENTS

| | | | |
|---|---|---|---|
| 2,798,891 | 7/1957 | Schaeffer | 260—674 |
| 2,849,513 | 8/1958 | Schaeffer | 260—674 |
| 2,926,206 | 2/1960 | Schaeffer et al. | 260—674 |
| 2,951,104 | 8/1960 | Schaeffer et al. | 260—674 |
| 3,049,575 | 8/1962 | Schaeffer | 260—674 |

ALPHONSO D. SULLIVAN, *Primary Examiner.*